United States Patent
Plainer et al.

(10) Patent No.: US 12,000,716 B2
(45) Date of Patent: Jun. 4, 2024

(54) DETERMINING THE POSITION OF A MOVABLE COMPONENT RELATIVE TO A STATIONARY COMPONENT

(71) Applicant: B&R INDUSTRIAL AUTOMATION GMBH, Eggelsberg (AT)

(72) Inventors: Manuel Plainer, Eggelsberg (AT); Andreas Weber, Eggelsberg (AT); Alexander Almeder, Eggelsberg (AT)

(73) Assignee: B&R INDUSTRIAL AUTOMATION GMBH, Eggelsberg (AT)

(*) Notice: Subject to any disclaimer, the term of this patent is extended or adjusted under 35 U.S.C. 154(b) by 117 days.

(21) Appl. No.: 17/780,682

(22) PCT Filed: Nov. 27, 2020

(86) PCT No.: PCT/EP2020/083675
§ 371 (c)(1),
(2) Date: May 27, 2022

(87) PCT Pub. No.: WO2021/105387
PCT Pub. Date: Jun. 3, 2021

(65) Prior Publication Data
US 2023/0160721 A1    May 25, 2023

(30) Foreign Application Priority Data

Nov. 29, 2019  (AT) .............................. A 51045/2019

(51) Int. Cl.
| | |
|---|---|
| *G01D 5/14* | (2006.01) |
| *G01D 5/244* | (2006.01) |
| *G01D 5/245* | (2006.01) |
| *G01D 5/249* | (2006.01) |
| *G05B 1/01* | (2006.01) |

(Continued)

(52) U.S. Cl.
CPC ........... *G01D 5/145* (2013.01); *G01D 5/2449* (2013.01); *G01D 5/2451* (2013.01); *G01D 5/249* (2013.01);

(Continued)

(58) Field of Classification Search
CPC .... G01D 5/145; G01D 5/2449; G01D 5/2451; G01D 5/249; G05B 1/01; G06F 17/17;

(Continued)

(56) References Cited

U.S. PATENT DOCUMENTS

| | | |
|---|---|---|
| 6,876,107 B2 | 4/2005 | Jacobs |
| 7,932,684 B2 | 4/2011 | O'Day et al. |

(Continued)

FOREIGN PATENT DOCUMENTS

| | | | |
|---|---|---|---|
| DE | 10 2007 036984 | 1/2009 | |
| EP | 3361220 A1 * | 8/2018 | ............... G01D 5/00 |

OTHER PUBLICATIONS

Int'l Prelim. Exam. Report (Form PCT/IPEA/409) conducted in Int'l Application No. PCT/EP2020/083675 (Jun. 2, 2022).

*Primary Examiner* — Tung X Nguyen
*Assistant Examiner* — Robert P Alejnikov, Jr.
(74) *Attorney, Agent, or Firm* — GREENBLUM & BERNSTEIN, P.L.C.

(57) ABSTRACT

For determination of the position of a movable component with a plurality of position magnets relative to a stationary component with a plurality of position sensors, it is provided that the sensor responses are detected for a group of position sensors in the region of the movable component, sensor model responses of the group of position sensors are determined from a sensor model for a plurality of assumed different relative positions of the movable component relative to the stationary component, the sensor model responses are compared with the sensor responses and the assumed relative position with the smallest deviation between the sensor model responses and the sensor responses is used as the relative position of the movable component.

11 Claims, 6 Drawing Sheets

(51) Int. Cl.
*G06F 17/17* (2006.01)
*H02K 11/215* (2016.01)
*H02K 41/03* (2006.01)
*H02P 6/00* (2016.01)

(52) U.S. Cl.
CPC ............... *G05B 1/01* (2013.01); *G06F 17/17* (2013.01); *H02K 11/215* (2016.01); *H02K 41/031* (2013.01); *H02P 6/006* (2013.01)

(58) Field of Classification Search
CPC .... H02K 11/215; H02K 41/031; H02K 41/02; H02P 6/006
USPC .................................................... 324/207.11
See application file for complete search history.

(56) References Cited

U.S. PATENT DOCUMENTS

| | | | | |
|---|---|---|---|---|
| 7,994,742 | B2 * | 8/2011 | O'Day | G01D 18/001 |
| | | | | 318/135 |
| 10,476,413 | B2 * | 11/2019 | Weber | H02K 41/031 |
| 2006/0006822 | A1 | 1/2006 | Kro et al. | |
| 2011/0025313 | A1 | 2/2011 | Zangl et al. | |
| 2012/0259573 | A1 | 10/2012 | Mehnert et al. | |
| 2014/0243750 | A1 * | 8/2014 | Larsen | G01B 7/30 |
| | | | | 604/218 |
| 2016/0241173 | A1 * | 8/2016 | Prüssmeier | H02P 6/006 |
| 2018/0113002 | A1 * | 4/2018 | Shimizu | H02K 11/215 |
| 2019/0234761 | A1 * | 8/2019 | Heyd | G01D 5/145 |

* cited by examiner

DETERMINING THE POSITION OF A MOVABLE COMPONENT RELATIVE TO A STATIONARY COMPONENT

The present invention relates to a method for determination of the position of at least one movable component relative to a stationary component, wherein an array of a plurality of position magnets with a pole pitch is arranged on the movable component and an arrangement of a plurality of position sensors with a sensor pitch is arranged on the stationary component, wherein a position sensor detects a magnetic field of a position magnet in the region of this position sensor in the form of a sensor response. The invention also relates to a movement arrangement with a movable component and a stationary component with determination of the position of the movable component relative to the stationary component.

Linear motors or planar motors are characterized in that a movable part (the rotor) is moved relative to a fixed part (the stator) due to interacting magnetic fields. For this purpose, a drive magnet (electromagnet or permanent magnet) is arranged on one of the two parts and, in order to generate a propulsive force, interacts with the magnetic field generated by energized drive coils on the other part. If a voltage is applied to the drive coil, a magnetic field is produced which interacts with the magnetic field of the drive magnet, thereby generating a force on the movable part, which moves the movable part. For movement of the rotor, a moving magnetic field is generated by appropriate control of the drive coils. This basic motor principle is well known, which is why it does not need to be discussed in more detail here. In principle, it is also irrelevant whether the drive coils are provided on the moving part (rotor) or the stationary part (stator).

To control the movement of the rotor of a linear motor, it is advantageous to know its current position relative to the stator in order to be able to control the drive coils correctly for generating the moving magnetic field. The determination of the position of the rotor therefore plays a special role in the operation of the linear motor. In this case, it is particularly difficult to determine the current position of the rotor when the linear motor is switched on, because it is not possible to know in advance where the rotor is at the time of switching on. Various methods have already been proposed for determination of the position when the linear motor is switched on.

U.S. Pat. No. 7,932,684 B2 describes, for example, a linear motor which, for determination of the position, additionally comprises position magnets arranged on the rotor and stationary position sensors (e.g. arranged on the stator). If the rotor is moved, the position magnets move relative to the position sensors and the current position of the rotor relative to the stator can be determined. The position magnets comprise a first row of a number of permanent magnets arranged next to one another, which interact with an incremental sensor, and a second row of a number of permanent magnets arranged next to one another, which interact with an absolute sensor. The absolute sensor, for example a Hall effect sensor, is designed so that it only supply two states, wherein the state changes at a defined position of the rotor. The incremental sensor, for example a magnetoresistive sensor, is designed in such a way that it supplies many recurring sensor cycles, wherein the position can be determined very precisely within one sensor cycle. When the motor is switched on, "homing" must first be carried out, i.e. referencing of a predetermined, known zero position. For this purpose, the rotor is moved until the absolute sensor detects a change in state, whereby the zero position is determined. Starting from the zero position, the current position of the rotor can then be determined incrementally by counting of the number of sensor cycles and precise determination of the position within the sensor cycles. In order to determine the position of the rotor when the motor is switched on, reference travel, that is to say a movement of the rotor, is therefore necessary in U.S. Pat. No. 7,932,684 B2. However, this type of position detection can only be sensibly implemented in the case of relatively restricted ranges of movement of the rotor. This type of determination of the position is, of course, absolutely unsuitable for many applications, in particular for linear motors with a large range of movement or for long stator linear motors with a large number of rotors.

The determination of an absolute position, even when the linear motor is switched on, can be found in U.S. Pat. No. 7,994,742 B2. In this case, an elongated position magnet is arranged on the rotor over the possible range of freedom of movement, wherein the position magnet is arranged so that a position-dependent offset results in the transverse direction. A position sensor which detects the magnetic field of the position magnet is arranged on a stationary structure, for example the stator. Due to the offset, at every position of the rotor there is a unique magnetic field which is detected by the position sensor. Thus, even when the linear motor is switched on, the current position of the rotor can be inferred immediately and without movement of the rotor. However, the freedom of moment is of course limited to the length of the position magnet and thus is very limited. This type of determination of the position is, of course, absolutely unsuitable for many applications, in particular for linear motors with a large range of movement or for long stator linear motors with a large number of rotors.

U.S. Pat. No. 6,876,107 B2 describes a known long stator linear motor as a linear motor. Such a long stator linear motor comprises a large number of drive coils which are arranged in a stationary manner next to one another and form the stator of the long stator linear motor. A large number of rotors which can be moved along the stator can be arranged along the stator. Each rotor carries a drive magnet. In order to move the rotor, the drive coils that are currently interacting with a rotor are energized. In this way, individual rotors can be moved independently of one another along the stator. Such long stator linear motors are often used in flexible transport systems, for example in a production process or in conveyor technology. U.S. Pat. No. 6,876,107 B2 also describes the determination of a true absolute position, which makes it possible to determine the exact position of a rotor immediately upon switching on of the long stator linear motor without having to carry out referencing (for example by reference travel of the rotor). This is of course very advantageous, especially when it is considered that a few hundred rotors can often be present at the same time in a long stator linear motor. For this purpose, precisely one additional position magnet is arranged on a rotor and a large number of position sensors, for example magnetoresistive sensors which detect the magnetic field of the position magnet, are arranged along the stator. The position sensors must, however, be arranged so close together that it is ensured that at least one position sensor can detect the magnetic field of the position magnet at any point in time. When the long stator linear motor is switched on, at least one position sensor responds for each rotor, so that the determination of the position is also possible without referencing of the rotor. The disadvantage here is that an additional position magnet is required and the position sensors have to be arranged very close together, which makes a large number of such position sensors necessary.

EP 3 376 166 A1 in turn describes the position detection for the rotors of a long stator linear motor when the motor is switched on. The drive magnets on the rotor are used for position detection and no additional position magnets are required for position detection. The position sensors can also be arranged at a greater distance from one another, so that the number of position sensors required can be reduced. For the position detection, first of all a rough position of the rotor is determined by determining an edge region of an array of drive magnets on the rotor. For one of the drive magnets a position sensor is determined, which detects the magnetic field of this drive magnet. A relative position of the rotor relative to the position sensor can then be determined using this position sensor. As the installation position of the position sensor is known, the absolute position of the rotor can be determined from the known installation position and the determined relative position. Although this method operates very reliably, it also has weak points. In particular, if two rotors are very close to one another or even abut one another, this method can fail because the edge region cannot be determined or can only be determined unreliably, or because it cannot be recognized that a plurality of rotors are close to one another.

Similar problems also arise with position measuring systems in which position magnets, the magnetic field of which is detected by position sensors on a stationary part, are arranged on a moving part. Here, too, there is the fundamental problem of ascertaining how the moving part, or also possibly a plurality of moving parts, is or are positioned relative to the stationary part when the motor is switched on.

It is therefore the object of the present invention to specify a method for determining the position of a movable component with a plurality of position magnets relative to a stationary component with a plurality of position sensors. The method should in particular also be capable of recognizing a plurality of movable components that are closely or completely adjacent to one another and enabling reliable determination of the position even for such moving components that are closely or completely adjacent to one another.

This object is achieved with the features of the independent claims. By the use of a sensor model, the unknown position of the movable component can be found by comparing the sensor model responses with the actually measured sensor responses while varying the assumed position of the movable component. On the one hand, this method is very robust in that it enables a reliable determination of the position, even in the event of deviations due to an imprecise installation position of the position sensors or in the event of deviations in the position magnets. The sensor model describes the profile of the sensor response of a position sensor when the array of position magnets is moved past the position sensor. Therefore, it is only required to determine the sensor model once and can then be used for each position sensor. On the other hand, movable components that are close or completely adjacent to each other can be recognized and identified by the use of sensor models. The method is not only capable of recognizing where a movable component is located, but also which movable component (if there are different movable components) is located where.

The present invention is described in greater detail below with reference to FIG. 1 to 9 which show schematic and non-limiting advantageous embodiments of the invention by way of example. In the figures.

Figure 1:
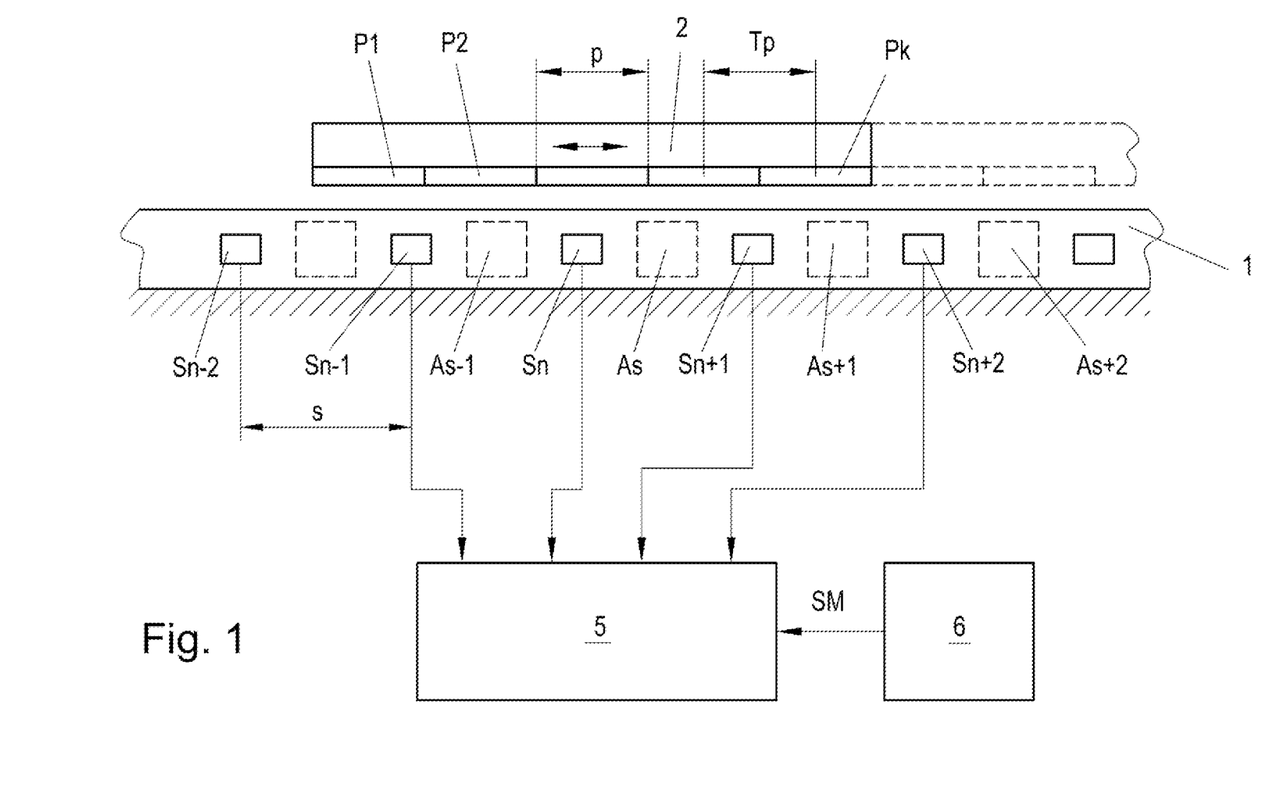
FIG. 1 shows a movement arrangement with a stationary component and a moveable component that is movable relative thereto.

As shown in FIG. 1, the invention is based on a movement arrangement in which a plurality of position sensors Sn with n>1 are arranged next to one another on a stationary component 1 and a plurality of position magnets Pk with k>1, permanent magnets or electromagnets, are arranged next to one another on a movable component 2. The movable component 2 is moved relative to the stationary component 1. The movable part 2 is arranged so that the position sensors Sn can detect a magnetic field of a position magnet Pk. This usually means that the position magnets Pk on the movable component 2 are arranged facing the stationary component 1, and the position sensors Sn, each with their active surface, are arranged facing the movable component 2. The position magnets Pk do not have to be arranged directly adjacent to one another, as shown in FIG. 1. The distance between two adjacent position magnets Pk is referred to as the pole pitch Tp. The pole pitch Tp can be, but does not have to be, equal to the position magnet width p. The pole pitch Tp can be, but does not necessarily have to be, smaller than the sensor spacing s between two adjacent position sensors Sn. The position magnets Pk can be arranged on the movable component 2 with alternating polarity (see also FIG. 2). In the case of a planar motor, this results in such an array in a plane in two directions.

Such a movement arrangement occurs in many applications. An example is a linear motor, long stator linear motor or planar motor, in which a plurality of drive coils As with s>1 are additionally arranged on the stationary component 1, as indicated by dashed lines in FIG. 1. In the case of a planar motor, the drive coils As are arranged in a plane, and in the case of a linear motor or long stator linear motor they are arranged next to one another in one direction of movement. In this case, the stationary component 1 forms the stator of the motor along which the movable component 2 can be moved. A plurality of drive magnets are arranged on the movable component 2, which in this application forms the rotor of the motor. The drive magnets can simultaneously be the position magnets Pk (as described, for example, in EP 3 376 166 A1) or the drive magnets and the position magnets Pk are provided separately from one another. If the drive coils As are energized in the region of the movable component 2 (by application of an electrical voltage), for example under the control of a drive controller (not shown), a drive magnetic field is generated that interacts with the magnetic field of the drive magnets on the movable component 2 in order to generate a propulsive force on the movable component 2. The drive magnets can be permanent magnets or electromagnets. In the case of electromagnets, permanent magnets could also be provided on the stationary component 1 instead of drive coils As. This motor principle is well known, which is why it will not be discussed in detail here.

Another application is pure position detection in a movement arrangement with a component 2 that is movable relative to the stationary component 1, for example a slide on a machine tool. In this application, the movable part 2 is moved by some other mechanism and the position of the movable part 2 relative to the stationary component 1 is to be determined.

The position sensors Sn used measure the magnetic field M, for example the magnitude and/or direction, of the magnetic field of a position magnet Pk in the region of the respective position sensor Sn. Possible position sensors Sn are magnetostrictive sensors, magnetoresistive sensors (such as an anisotropic magnetoresistive sensor, a tunnel magnetoresistance sensor or giant magnetoresistance sensor) or a Hall effect sensor. In addition, there can of course also be further types of sensors that are capable of detecting a magnetic field M. Different types of sensors can also indicate the magnitude of the magnetic field M (if this is detected) differently. A Hall effect sensor supplies, for example, a value which indicates the magnetic field intensity (for example in Tesla), wherein the Hall effect sensor is not usually operated in saturation. A magnetoresistive sensor, on the other hand, supplies a value in a specific value range, for example between zero and one, wherein the sensor is usually operated in saturation. This means that such a sensor supplies the value one, for example, for a wide range of the magnetic field intensity. With such a sensor it is usually not possible to obtain an absolute value of the magnetic field intensity of the magnetic field M, but statements can only be made about whether the respective sensor type is in the saturation range or not.

Figure 2:
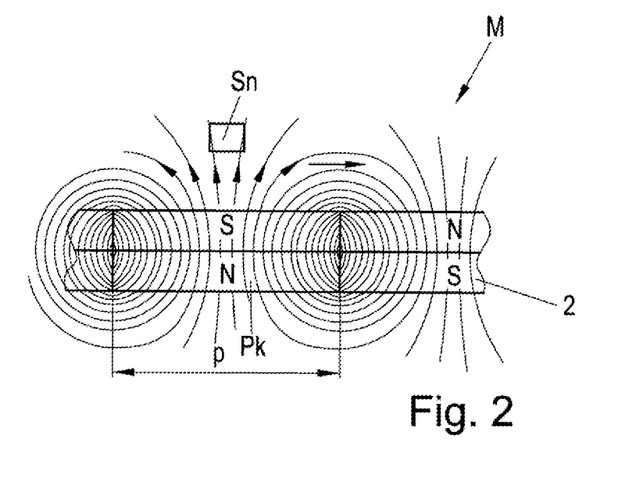
FIG. 2 shows a typical magnetic field of an array of position magnets on the movable component.

In FIG. 2, the magnetic field M of an array of position magnets Pk on the movable component 2 is shown in the form of the magnetic field lines. It can be seen that the magnetic field M is strongest in the center of a magnetic pole and drops rapidly towards the edge. It can also be seen that the magnetic field M in the surrounding area, that is to say also with a greater spacing from the position magnet Pk, exhibits a sharp decrease relatively quickly. It is therefore advantageous if the air gap between the position sensor Sn and the position magnet Pk is not more than half the pole pitch Tp in order to increase the reliability of the measurement.

Figure 3:
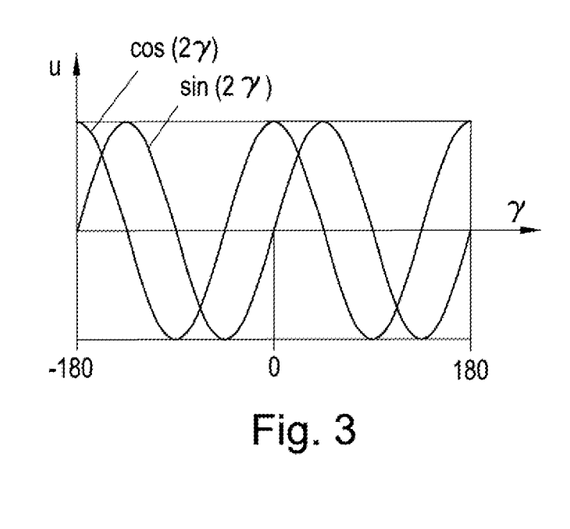
FIG. 3 shows a typical sensor signal of a position sensor.

A position sensor Sn supplies, for example, a sine and cosine track (in the form of an electrical voltage measurement value u) as a sensor signal, as shown in FIG. 3. As is known, from the sensor signals (sine and cosine track). e.g. in the form of a voltage u, depending on the angle γ of the magnetic field M, i.e. the angle at which the magnetic field M impinges on the position sensor Sn, the position x of an individual movable position magnet Pk can be determined in a linear approximation proportionally to the magnetic field angle γ of the magnetic field M, for example as $x = k \cdot \arctan(\sin(2\gamma)/\cos(2\gamma))$, with k as a constant factor, e.g. $k = p/(2\pi)$. The position sensor Sn can of course directly supply the position x as the sensor response SA, or the sine and cosine track, which is then evaluated, or angle information γ. The position sensor Sn can also (depending on the type of sensor) supply as sensor response SA an absolute value |A| for the magnitude of the magnetic field M (amplitude of the sine and cosine track), for example as $|A| = \sqrt{u\sin^2(2\gamma) + u\cos^2(2\gamma)}$.

The sensor response SA can thus also contain a plurality of variables, for example angle information γ and absolute value |A|.

Figure 4:
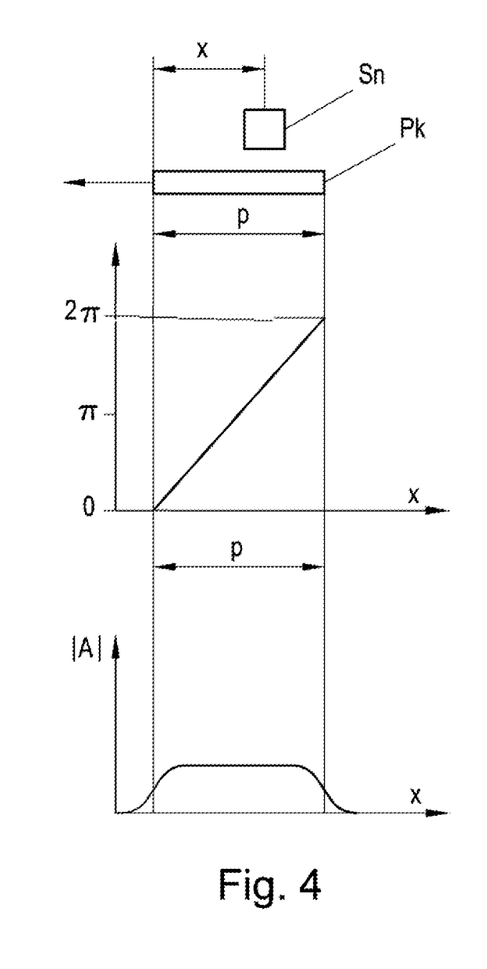
FIG. 4 shows a typical sensor response of a position sensor obtained from the sensor signal.

If a position magnet Pk is moved past a position sensor Sn, the result is the typical sawtooth-like profile of the angle information γ between zero and 2π (value depending on the sensor) and the profile of the absolute value |A| depending on the position x of the position magnet Pk relative to the position sensor Sn, as shown in FIG. 4. The absolute value |A| can be largely constant when the position sensor Sn goes into saturation, such as, for example, in the case of a magnetoresistive sensor. With other sensor types, for example with a Hall effect sensor, the result can be a different profile of the absolute value |A|. Other types of sensors can also supply other sensor signals and/or sensor responses SA that represent the detected magnetic field.

Figure 5:
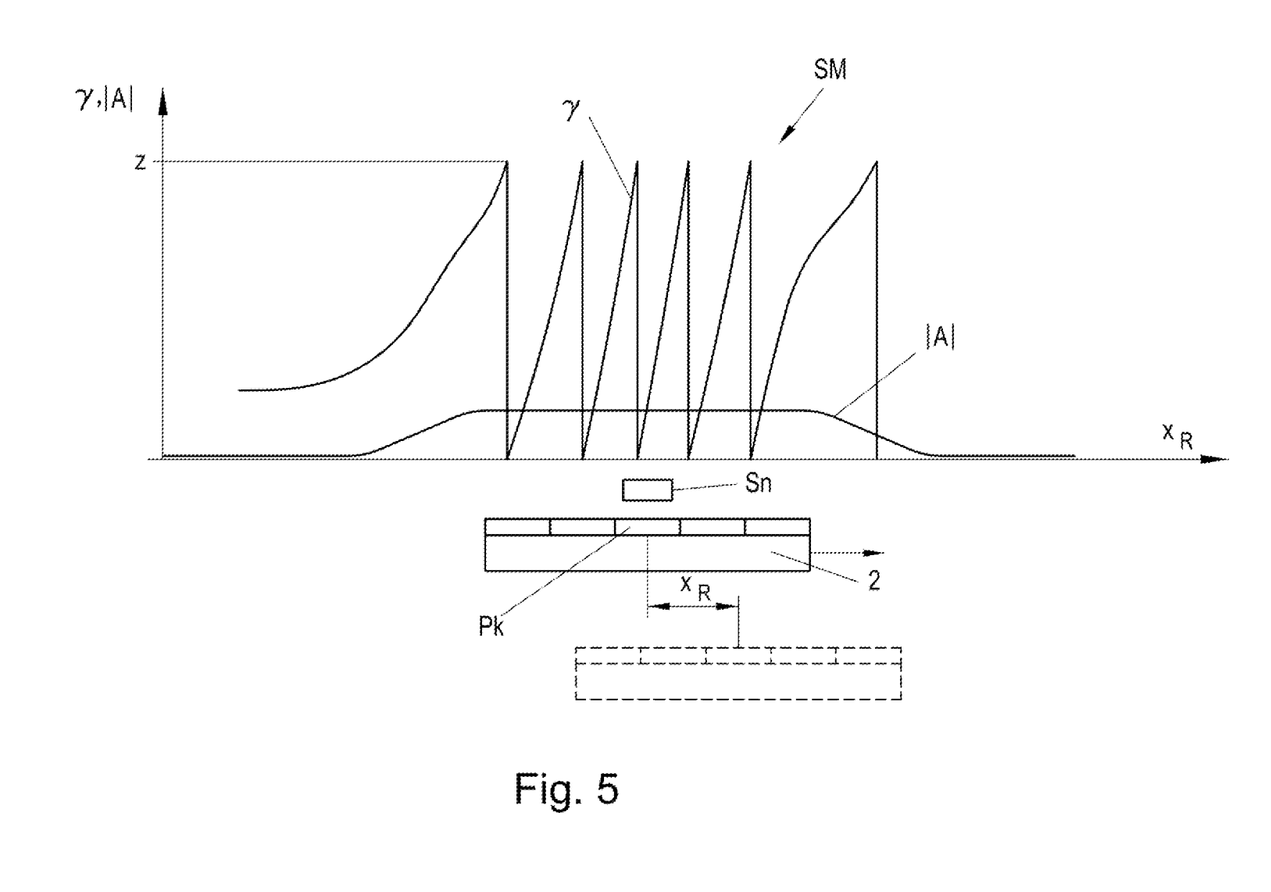
FIG. 5 shows a typical profile of the sensor response as a function of a relative position of the movable component relative to the position sensor, as an example of a sensor model.

If an array of position magnets Pk with k>1 on the movable component 2 (for example as shown in FIG. 1) moves past a position sensor Sn, the result is a sawtooth-like profile of the angle information γ and/or the profile of the absolute value |A| over the relative position $x_R$ of the movable component 2 relative to the stationary component 1, as shown in FIG. 5 for k=5 position magnets Pk.

The value of the angle information γ can also be scaled with a constant factor. For example, it can be specified that the position sensor Sn supplies the value π/2 for the angle information γ at the center of the position magnet Pk. According to FIG. 4, the value T would be expected. Thus it is scaled with the factor −π/2. If the edge of the position magnet Pk is measured by the sensor, this would result in 3π/2 and the value 0 would be supplied at ¼ of the position magnet Pk. Such a scaling is also the reason why, for five position magnets Pk, six sawtooth-shaped peaks are included in the profile of the angle information γ in FIG. 5. Such a scaling is, however, irrelevant for the invention; it only has to be known and applied uniformly.

FIG. 5 also shows the non-linear profile of the angle information γ, in particular in the edge region of the movable component 2, and also the field expansion (results in wider sawtooth-shaped peaks at the edge) at the edge of the array of the position magnets Pk as a result of the magnetic field M as shown in FIG. 2.

The relative position $x_R$ between the movable component 2 and the position sensor Sn is related to any point on the movable component 2, for example to the center (viewed in the direction of movement) or to one end of the movable component 2 or of the array of the position magnets Pk. In FIG. 5, for example, the center of the array of the position magnets Pk is selected as the zero point of the relative position $x_R$, as indicated by the shifted position of the movable part 2 shown in broken lines. Depending on the position of the movable component relative to the stationary position sensor Sn, positive and negative values of the relative position $x_R$ would result in relation to the selected zero point. The relative position $x_R$ indicates the position of the movable component 2 relative to a position sensor Sn.

If the position x(i) (regardless of whether it is an absolute position or a relative position) of the movable component 2 at the current sampling time (i) (in which time interval the position is determined) is known, then from the determined position x(i−1) of the previous sampling time (i−1), the current position x(i) can be determined in a trivial manner, for example from the known movement of the movable component 2. The main problem, however, is to determine the position x(i) independently of the information about the position x(i−1) of the previous sampling time (i−1), for example and in particular initially when the system is switched on or started up.

When switching on or starting up, all position sensors Sn on the stationary component 1 can be read out, but it cannot be said which position magnet Pk of a movable component 2 is detected by a specific position sensor Sn. Each position magnet Pk on the movable component 2 can produce the same sensor response SA, for example the same angle information γ, for a specific position sensor Sn. Therefore, the sensor response SA measured with a position sensor Sn is not unambiguous. In order to resolve this ambiguity and also to enable a reliable determination of the position in such situations, the procedure according to the invention is as follows.

For a given combination of a known array of position magnets Pk (pole length p, pole pitch Tp, orientation and polarity of the position magnets Pk, etc.) on a movable component 2 and a specific known position sensor Sn (sensor type, distance between sensor and position magnet, etc.) on a stationary component 1 a sensor model SM can be determined which ascertains a sensor model response SA*, for example the angle information γ* and/or the absolute value |A|*, as a function of the relative position $x_R$ of the movable component 2 relative to the stationary component 1 or to the position sensor Sn. For the angle information γ* and the absolute value |A|*, the sensor model SM corresponds, for example, to the profile of these variables as shown in FIG. 5. The sensor model SM thus indicates which values of the sensor response SA can be expected with a specific position sensor Sn at different relative positions $x_R$ of a specific movable component 2. Such a sensor model SM can be determined for a certain combination of the array of position magnets Pk and a position sensor Sn, for example, by measuring technology by moving the array of the position magnets Pk past the position sensor Sn and recording and storing the sensor model response SA*. However, the sensor model SM can also be determined by simulation or calculation. The sensor model response SA* can also be detected in that way. This sensor model SM is stored.

Hence, the sensor model SM is determined in that the profile of the sensor model response SA* is detected when the complete array of the plurality of the position magnets Pk is moved past the position sensor Sn on the stationary component 1. During the movement past the position sensor Sn, the sensor responses SA are detected and used as sensor model responses SA*. The sensor model SM is therefore independent from the arrangement of the position sensors Sn on the stationary component 1, because the sensor model response SA* is detected with regard to only a single position sensor Sn.

If a plurality of different movable components 2 are present, e.g. with different numbers of position magnets Pk, as is quite common, for example, with a long stator linear motor or planar motor, or if different position sensors Sn are provided on the stationary component 1, then there is of course an associated sensor model SM for every possible combination of the array of position magnets Pk and a position sensor Sn.

The sensor model SM, or the sensor models SM, of course only has/have to be determined once for a specific movement arrangement. Consequently, for the implementation of the method for determination of the position, the sensor model SM can be assumed to be known and given.

The sensor model SM can be stored in the form of the values of the sensor model response SA*, i.e. for example the values of the angle information γ* and/or the absolute values |A|*, as a function of the relative position $x_R$ as in FIG. 5. However, this can require a great deal of memory, in particular if the sensor model SM is to be stored with a high resolution of the relative position $x_R$ and/or of the sensor model response SA*.

Figure 6:
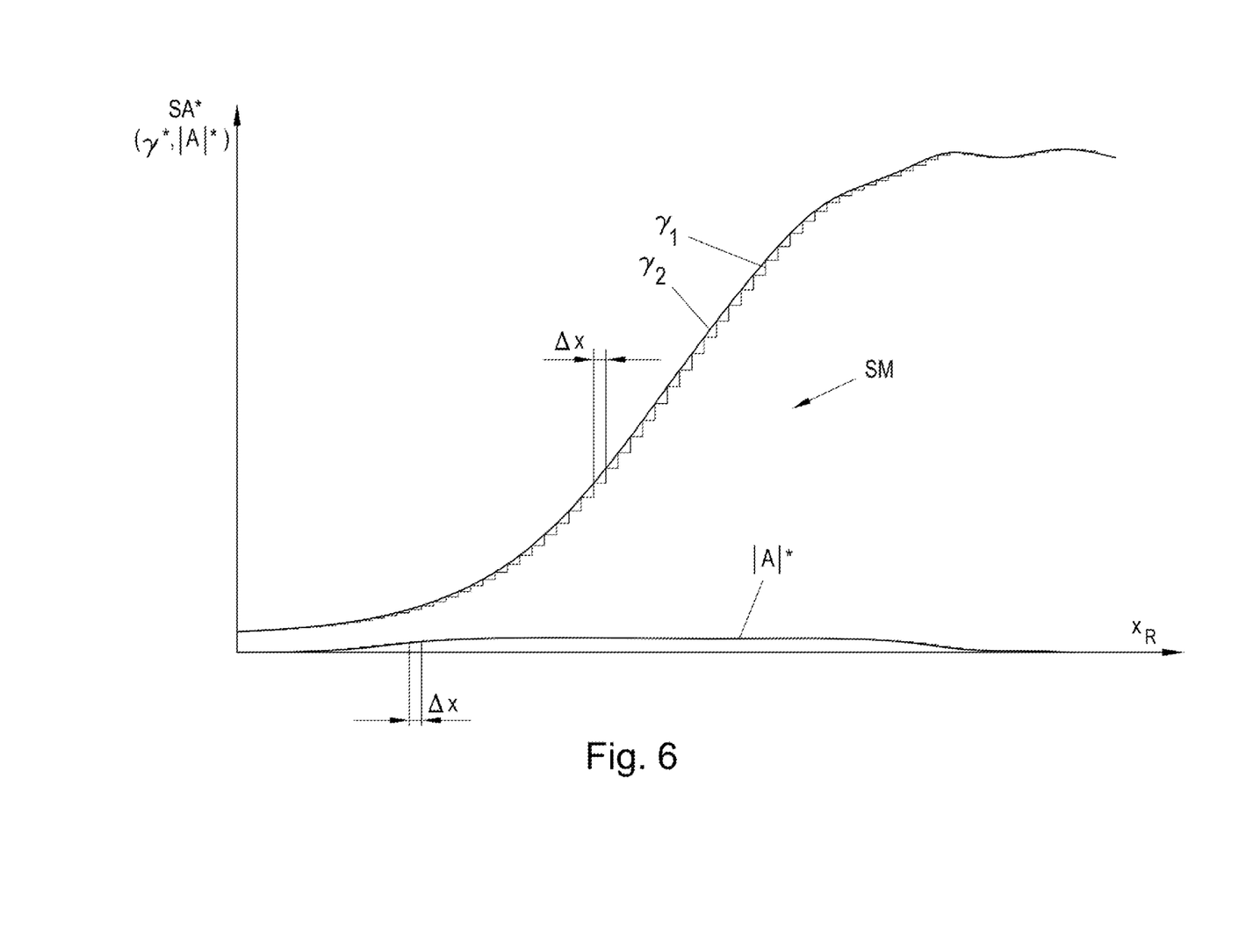
FIG. 6 shows an alternative way of storing a sensor model.

For this reason it is also possible to store the sensor model SM of the sensor model response SA* in a different form, as is explained with reference to FIG. 6. The sensor model SM according to FIG. 5 is discretized in position increments Δx and the overflows (number depending on the number of position magnets Pk) of the sawtooth-shaped profile of the angle information γ* with the height z (e.g. 2π) are added up over the relative position $x_R$. This results in the discrete profile of the angle information $γ_1$ in FIG. 6. A curve that is as smooth as possible, for example a spline or another suitable smooth curve, is approximated in this discrete profile. As is known, a spline is a function that is pieced together from polynomials of a certain degree, wherein the discrete points can be the interpolation points of the spline. The angle information $γ_2$ approximated by the curve can then be stored as a sensor model SM in the form of the mathematical description of the selected curve, which requires significantly less memory. The sawtooth-shaped profile of the angle information γ* can be calculated simply from the approximated angle information $γ_2$ by using the modulo function mod, i.e. $γ*(x_R) = γ_2(x_R)$ mod z (for example z=2π).

The profile of the absolute value |A|* in the sensor model SM could likewise be discretized with position increments Δx in order to obtain interpolation points into which a smooth curve, for example a spline again, can then be approximated. This would also make it possible to store the profile of the absolute value |A|* in the form of a mathematical description of the curve. In this case, the value of the absolute value |A|* for a specific relative position $x_R$ can be determined directly from the stored curve.

The same procedure can also be used for other or additional sensor responses SA or sensor model responses SA* of the sensor model SM.

Figure 7:
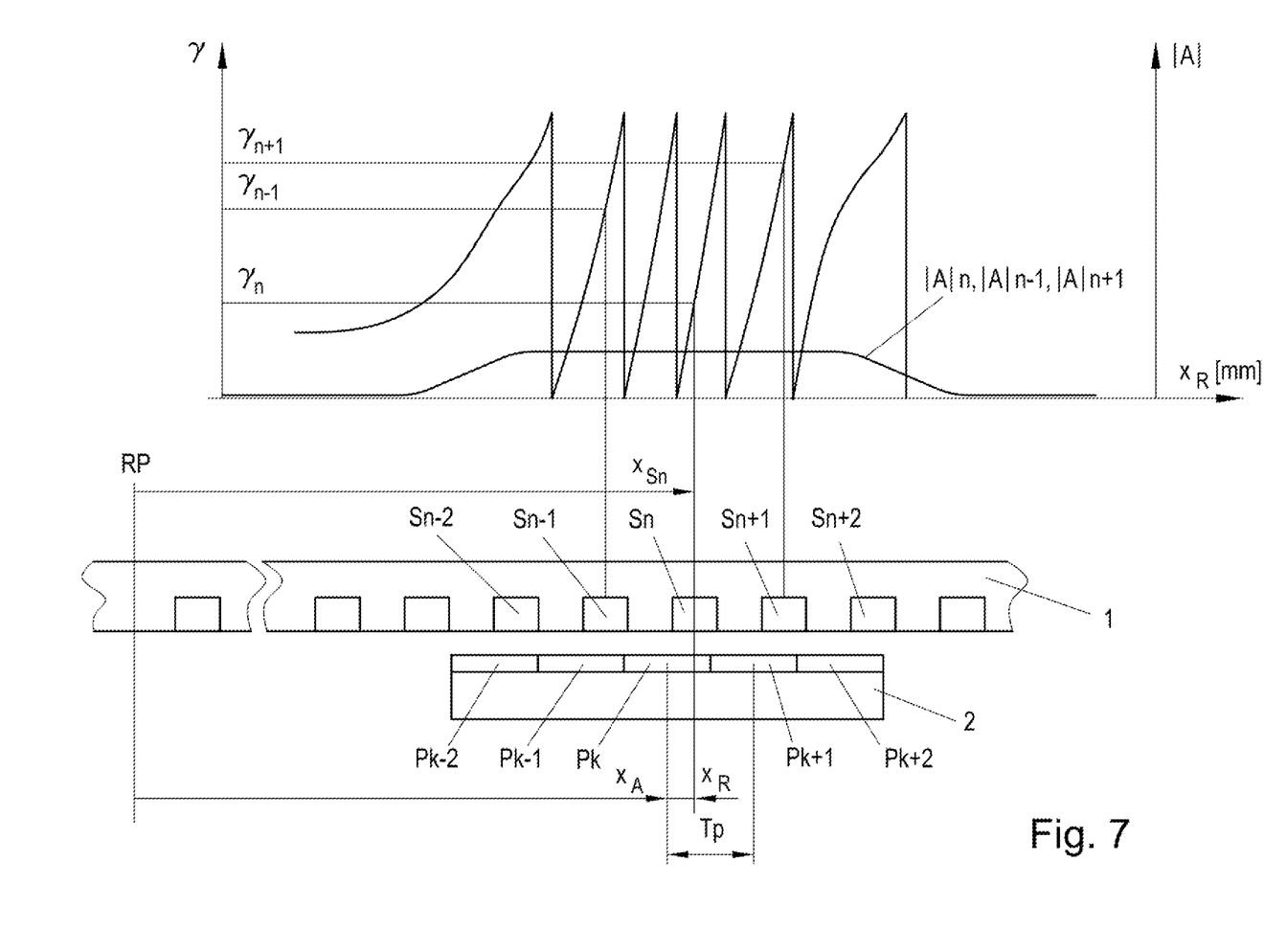
FIG. 7 shows a possible situation during determination of the position.

A movable part 2 with a number of position magnets Pk in a specific relative position $x_R$ with respect to the stationary component 1 with the position sensors Sn is shown in FIG. 7. In this relative position $x_R$ of the movable component 2, the magnetic fields M of the position magnets Pk on the movable component 2 cause sensor responses SA from a specific number of position sensors Sn in the region of the movable component 2. How many position sensors Sn respond naturally depends on the sensor spacing s and also on the strength of the magnetic fields. For the determination of the position, preferably only those position sensors Sn that respond are taken into account. To this end, it is possible to specify a limit value of the sensor response SA, for example for the absolute value |A|, from which a sensor response SA of a position sensor Sn is taken into account as a measured value. However, a predetermined number of position sensors Sn in the region of the movable component 2 can also always be taken into account. The j position sensors $Sn_j$ taken into account for the determination of the position are usually a subset of the existing position sensors Sn.

If one position sensor Sn is considered, this supplies a corresponding sensor response SAn, for example the angle information γn and the absolute value |A|n, depending on the position of a position magnet Pk, the magnetic field M of which is measured, relative to the position sensor Sn (as shown in FIG. 4). The other considered position sensors Sn−1, Sn+1 also supply sensor responses, for example angle information $\gamma n-1$, $\gamma n+1$ and absolute values $|A|n-1$, $|A|n+1$. All $j\geq 1$ considered position sensors $Sn_j$ each deliver a sensor response $SA_j$.

In addition, the sensor model SM for this movable component 2 and the existing position sensors Sn is known. The object now is to determine the relative position $x_R$ of the movable component 2 in such a way that the sensor model responses $SA^*_j$ of the considered position sensors $Sn_j$ from the sensor model SM coincide to the best possible extent with the actually detected sensor responses $SA_j$ of the considered position sensors $Sn_j$.

A specific relative position $x_R$ of the movable component 2 thus supplies sensor model responses $SA^*_j$ from the sensor model SM of the considered position sensors $Sn_j$. These sensor model responses $SA^*_j$ are compared with the sensor responses $SA_j$ actually detected by the considered position sensors Snj. For this purpose, the relative position $x_R$ of the movable component 2 is varied and for each varied relative position $x_{Rv}$ the sensor model response $SA^*_j(x_{Rv})$ is determined from the sensor model SM. Of course, this variation is only assumed and the movable component 2 is not physically moved on the stationary component 1 for this purpose. The relative position $x_{Rv}$ with the smallest deviation between the sensor model response $SA^*_j(x_{Rv})$ from the sensor model SM and the actually detected sensor responses $SA_j$ is then used to determine the relative position $x_R$ of the movable component 2 relative to the stationary component 1.

The absolute position $x_A$ can then simply be determined from the determined relative position $x_R$ with the known geometry of the movable component 2 and of the stationary component 1 and with the known installation locations of the position sensors Sn. The absolute position $x_A$ is related to a predetermined stationary reference point RP (FIG. 7), which can be fixed at any point, usually a point on the stationary component 1. The installation positions $x_{Sn}$ of the position sensors Sn are known. Thus, the absolute position $x_A$ can be calculated simply from $x_A=x_{Sn}+x_R$, for example. The absolute position $x_A$ could of course also be related to any other point of the movable component 2.

The relative position $x_{Rv}$ of the movable component 2 can be varied in different ways for the implementation of the method for determination of the position, as is explained below. For the following description, the angle information $\gamma$ and the absolute value $|A|$ are assumed as the sensor response SA. For the invention, however, only one of these variables can be used as the sensor response SA, or another variable supplied by the position sensors Sn or also additional variables supplied by the position sensors Sn can be used. The sensor responses SA used can be provided directly by the position sensors Sn, or can also be determined from sensor signals supplied by the position sensors Sn (as for example in FIG. 3), for example in a computing unit 5.

A group with a number j of position sensors $Sn_j$ is used to determine the relative position $x_R$ (or also the absolute position $x_A$) of a movable component 2. Of course, such position sensors $Sn_j$ are used which supply sensor responses SAj and are therefore located in the region of a movable component 2. In the example according to FIG. 7, for example, the position sensors Sn-2, Sn-1, Sn, Sn+1, Sn+2 could be used. Alternatively, only the position sensors Sn-2, Sn-1, Sn or the position sensors Sn, Sn+1, or others could be used. The position sensors $Sn_j$ used also do not necessarily have to be directly adjacent position sensors Sn.

Consequently, the position sensors Snj used to determine the relative position $x_R$ of the movable component 2, for example when the system is started up, supply sensor responses $SA_j$, for example $$SA_j = \begin{bmatrix} \gamma_j \\ |A|_j \end{bmatrix}.$$

For any relative position $x_{Rv}$ of the movable component 2, a sensor model response $SA^*_j(x_{Rv})$, for example $$SA^*_j = \begin{bmatrix} \gamma^*_j(x_{Rv}) \\ |A|^*_j(x_{Rv}) \end{bmatrix},$$

can be determined from the sensor model SM for each position sensor $Sn_j$.

For determination of the relative position $x_R$ of the movable component 2 relative to the stationary component 1 the sensor response SA, detected by the considered position sensors $Sn_j$ is compared with the sensor model responses $SA^*_j(x_{Rv})$ for the varied relative position $x_{Rv}$. The varied relative position $x_{Rv}$, at which the sensor model responses $SA^*_j(x_{Rv})$ of the considered position sensors $Sn_j$ come closest to the sensor responses $SA_j$ actually detected by the considered position sensors $Sn_j$, is used as a relative position $x_R$ of the movable component 2 or used for the determination of the relative position $x_R$ (e.g. if this is related to another point of the movable component 2) or the absolute position $x_A$ of the movable component 2.

For the comparison of the sensor responses SAj with the sensor model responses $SA^*_j(x_{Rv})$ a cost function J can be used as a function of the sensor responses $SA_j$ and the sensor model responses $SA^*_j(x_{Rv})$, i.e. $J=f(SA_j, SA^*_j(x_{Rv})) \; \forall j$, which evaluates the deviation between the measured sensor responses $SA_j$ and the sensor model responses $SA^*_j(x_{Rv})$ of the considered position sensors $Sn_j$. The cost function J preferably evaluates all j considered position sensors $Sn_j$. The cost function J can simply be formulated as the absolute value of a difference, for example $$J = \sum_j |SA^*_j(x_{Rv}) - SA_i|,$$

or as a squared error, for example in the form $$J = \sum_j (SA^*_j(x_{Rv}) - SA_i)^2,$$

or in any other suitable form. If the sensor response SA is a vector of a plurality of variables, for example as above of the angle information $\gamma$ and the absolute value $|A|$, then any norm, for example the Euclidean norm $\| \; \|_2$, can be used, for example $$J = \sum_j \|SA^*_j(x_{Rv}) - SA_i\|^2_2.$$

The one of the varied relative positions $x_{Rv}$ which optimizes (i.e. either minimizes or maximizes) the value of the cost function is then the sought relative position $x_R$ or is used to determine the relative position $x_R$ or the absolute position $x_A$ of the movable component 2.

Figure 8:
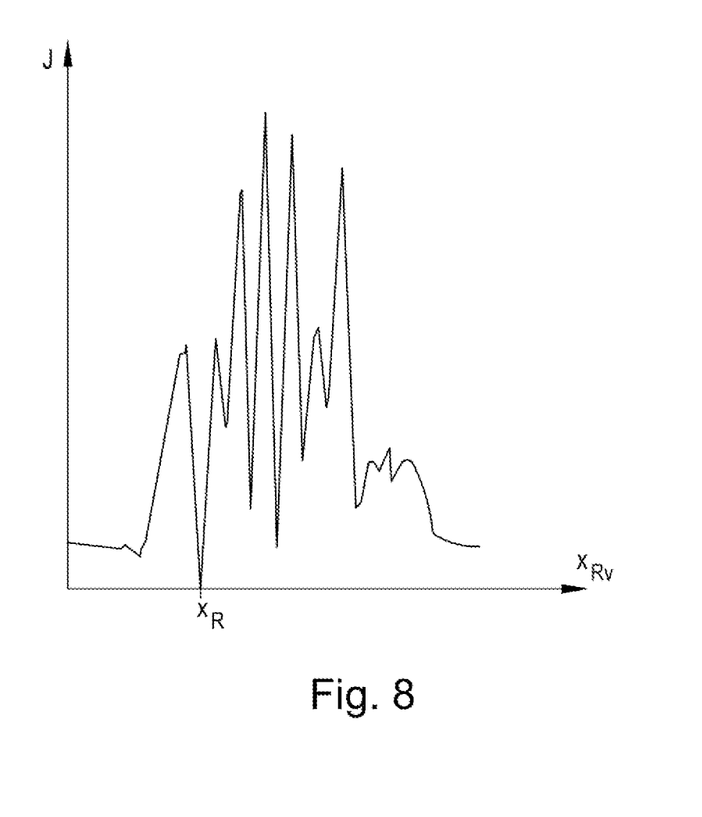
FIG. 8 shows a possible profile of the value of a cost function as a function of an assumed relative position and FIG. 9 shows a determination of position in the region of a switch in a long stator linear motor as an exemplary embodiment of a movement arrangement.

In a first embodiment, the relative positions $x_{Rv}$ could be varied in small position increments $\Delta x_R$. The smaller the position increment $\Delta x_R$, the higher the resolution. The range in which the relative position $x_{Rv}$ is varied can be predetermined, for example depending on the known geometric dimensions of the movable component 2 and/or the known sensor spacing s. For example, FIG. 8 shows a cost function J for such a variation. The position at the minimum of the value of the cost function J in the predetermined range is then the sought relative position $x_R$ or is used for determination of the relative position $x_R$ or of the absolute position $x_A$ of the movable component 2.

However, a second possible embodiment of the determination of the position is more advantageous. If k indicates the number of position magnets Pk on the movable component 2, then a specific one of the position sensors $Sn_j$ used can detect the magnetic field of one of these k position magnets Pk. The movable component 2 therefore only has to be varied by k pole pitches Tp in order to cover all possible positions of the movable component 2. In this way, the number of relative positions $x_{Rv}$ to be varied can be reduced significantly without sacrificing accuracy in determination of the position. In this case, too, a value for the cost function J is obtained for each of the varied relative positions $x_{Rv}$. The relative position $x_{Rv}$ at which the value of the cost function J is optimal (either minimal or maximal) is then the sought relative position $x_R$ or is used to determine the relative position $x_R$ or the absolute position $x_A$ of the movable component 2.

It is also possible to even further reduce the number of relative positions $x_{Rv}$ to be varied. For example, those relative positions $x_{Rv}$ of which the associated absolute values |A| are below a certain limit could be ignored.

In a further possible embodiment, the cost function J can be optimized (minimized or maximized) depending on the relative position $x_{Rv}$ in a mathematical optimization. Mathematically it can be represented in the form $J=f(SA_j, SA_j^\wedge(x_{Rv}))$, $x_R = \min J$. The varied relative positions $x_{Rv}$ result from the optimization algorithm, for example the Newton method, a gradient method, evolutionary algorithms, etc. The relative position $x_{Rv}$ is iteratively varied by the optimization algorithm so that the cost function J converges towards the minimum or maximum and is thus optimized. The first relative position $x_{Rv}$ of the iteration can be predetermined as desired or set by the optimization method used. A termination criterion is also predetermined for this purpose, i.e. the optimization is repeated iteratively until the termination criterion is reached. A possible termination criterion is falling below (or exceeding) a specified threshold value for the cost function or falling below a predetermined deviation of the values of the cost function J of two successive iterations.

It is also possible to use a plurality of different groups with position sensors $Sn_j$ for determination of the position. Certain position sensors $Sn_j$ can also be contained in a plurality of groups, but the groups differ in each case by at least one position sensor $Sn_j$. In the example in FIG. 7, for example, a first group could comprise position sensors Sn−1, Sn, Sn+1 and a second group could comprise position sensors Sn, Sn+1, Sn+2. The number of position sensors $Sn_j$ in the groups does not have to match. i.e. a first group can comprise, for example, two position sensors Sn; and another group can comprise three position sensors $Sn_j$.

A cost function J can thus be optimized for each group of position sensors $Sn_j$ by varying the relative position $x_{Rv}$ using a method as described above. A group could now be selected and the relative position $x_{Rv}$ at which the value of the cost function J for this group is optimal (either minimum or maximum) (or generally the relative position $x_{Rv}$ at which the deviation between the sensor model responses and the measured sensor responses is smallest), could be used as the sought relative position $x_R$ or used to determine the relative position $x_R$ or the absolute position $x_A$ of the movable component 2. The result of the optimization of the cost function with the other group could then be used to check plausibility of the determination of the relative position $x_R$ (or absolute position $x_A$) of the movable component 2. For example, the deviation between the two determined positions must not exceed a certain value. For example, the group of which the value of the cost function J is the smallest could be selected and the others could be discarded or used for plausibility checking.

If a plurality of different sensor models SM are present, for example because different movable components 2 are present, then the method described above must be carried out for each sensor model SM, that is to say for example to carry out the optimization on the basis of each sensor model SM. Thus this method not only supplies the relative position $x_R$ of the movable component 2, but also the information as to which movable component 2 is involved. For example, in the case of an optimization of a cost function J, the cost function J with one of the sensor models SM will be minimal, so that the movable component 2 is the one on which this sensor model SM is based.

If a single movable component 2 or a movable component 2 that is sufficiently far away from other movable components is present, then the minimum of the cost function J will approach zero (depending on the accuracy of the sensor model SM and the accuracy of the installation position of the position sensors $Sn_j$).

However, the method according to the invention for determination of the position also functions when two movable components 2 are close to one another or even lie directly on one another. "Close" is understood to mean an arrangement in which the magnetic fields M of the two movable components 2 influence one another within the measurement accuracy of the position sensors Sn. Due to the significant drop in the magnetic field M outside the position magnets Pk, it can be assumed that the influencing will only take place in the edge region of the movable components 2. In the region of influencing, the sensor model response SA* from the sensor model SM (which was determined for an isolated position sensor Sn) for a position sensor Sn will deviate more significantly from the sensor response SA measured with this position sensor $Sn_j$. Since a plurality of position magnets Pk are provided on the movable component 2 and a plurality of position sensors $Sn_j$ are always taken into account for determination of the position, there are position sensors $Sn_j$ for which a good match of the sensor model response SA* from the sensor model SM and the measured sensor response SA can be found. These are sufficient in order to determine the relative position $x_R$. This even works if more than two movable components 2 are closely or directly adjacent to one another. Thus it is also easily possible to determine the relative positions $x_R$ (or absolute position $x_A$) of a plurality of movable components 2 that are closely or directly adjacent to one another. Since the movable component 2 is also characterized by the sensor model SM, information can also be obtained as to which movable components 2 are closely or directly adjacent to one another.

Plausibility checks could also be carried out, in particular in the case of movable components 2 that are closely or directly adjacent to one another. If it follows from the determined relative positions $x_R$ (or absolute positions $x_A$) of two adjacent movable components 2 that the movable components 2 would overlap, then an error in the determination of the position is obvious. Since the geometries of the movable components 2 are known, such a plausibility check can be carried out easily. If a plurality of groups of position sensors $Sn_j$ are used for determination of the position, then, for example, the known dimensions of the movable component 2 could be used to select a group for determination of the position. For example, with the known dimensions of the movable components 2, the cost function J (which does not necessarily have to have the smallest value) can be selected, which makes the result of the determination of the position plausible.

Figure 9:
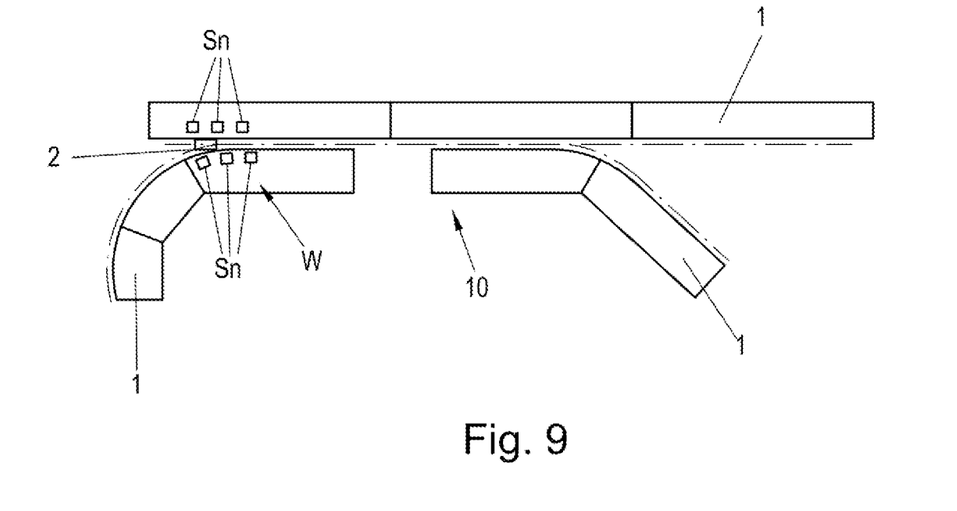

In the case of long stator linear motors 10, there are often stator designs in which two stationary components 1 of the long stator linear motor 10 are brought together at a switch W or a stationary component 1 is divided into two stationary components 1 at a switch W (depending on the direction of movement of the movable component 2), as shown in FIG. 9. In the region of a switch W, the movable component 2 can thus be guided on one of the two stationary components 1 involved. With the described methodology, the determination of the position can even be carried out in the region of switches W.

It can be expected that a sensor model SM of the movable component 2 can be made to coincide more precisely with measured sensor responses SA on a certain stationary component 1 of the switch W than on the other stationary component 1 of the switch W, because the air gaps between position sensors Sn and position magnets Pk are different in the region of the switch W (which in turn causes different magnetic fields at the position sensors Sn). If a cost function J is used, it will be smaller (or larger) for a certain stationary component 1 involved in the switch W than for the other stationary component 1 involved in the switch W, because the measured sensor responses $SA_j$ will deviate more significantly from the sensor model responses $SA^*_j$ due to the larger air gap. In this way, the relative position $x_R$ (or absolute position $x_A$) of a movable component 2 in the switch W can also be determined in the region of the switch W by the present method for determination of the position. In addition, at the same time it can also be determined at which of the stationary components 1 involved in a switch W the movable component 2 is currently located.

The described method for determination of the position can be carried out in a computing unit 5. For this purpose, the computing unit 5 receives the required sensor responses SA from the position sensors Sn (as indicated in FIG. 1). The computing unit 5 can be part of a controller of the movement arrangement, or can also be integrated in such a controller. The computing unit 5 is preferably microprocessor-based, for example a computer, a DSP (digital signal processor), a PLC (programmable logic controller) or the like, and the method for determination of the position can be implemented as software and stored for execution on the computing unit 5. The computing unit 5 can however also be an ASCI (application specific integrated circuit) or an FPGA (field programmable gate array) in which a microprocessor can also be integrated. Any other suitable hardware can also be used as the computing unit 5. The sensor models SM required for implementation can be stored in a memory unit 6 of the computing unit 5. Other data that may be required, for example the geometry of the movable components 2, the installation positions of the position sensors Sn, etc., can also be stored in the memory unit 6. The computing unit 5 can also comprise known input/output devices and/or data interfaces for data communication with other components (e.g. the controller of the movement arrangement), for example via a field bus such as Ethernet POWERLINK, DeviceNet, Profibus, CAN etc., or other bus systems such as Ethernet etc.

The invention claimed is:

1. A method for determination of a position of at least one movable component relative to a stationary component, wherein an array of a plurality of position magnets with a pole pitch is arranged on the movable component and an arrangement with a plurality of position sensors with a sensor pitch is arranged on the stationary component, the method comprising:

detecting, with one of the plurality of position sensors, a magnetic field of one of the plurality of position magnets in a region of the one position sensor in a form of a sensor response, wherein sensor responses are detected for a group of the plurality of position sensors in a region of the movable component considered for position determination, supplying, via a sensor model, sensor model responses for the at least one movable component and a position sensor, the sensor model responses being a function of a relative position of the movable component relative to the position sensor, wherein for a plurality of assumed different relative positions of the at least one movable component relative to the stationary component, determining sensor model responses of all position sensors of the group of position sensors with the sensor model, comparing the sensor model responses with the sensor responses detected with the group of position sensors, and at least one of:
  determining a relative position of the movable component from the plurality of assumed different relative positions with a smallest deviation between the sensor model responses from the sensor model and the detected sensor responses or
  determining a relative position of the movable component or an absolute position of the movable component relative to a stationary reference point from the determined relative position of the movable component from the plurality of assumed different relative positions with the smallest deviation between the sensor model responses from the sensor model and the detected sensor responses.

2. The method according to claim 1, wherein the sensor model is determined by detecting a profile of the sensor model responses when the array of the plurality of position magnets is moved past the one position sensor on the stationary component.

3. The method according to claim 1, wherein for the comparing of the sensor model responses with the sensor responses detected by the group of position sensors, the method further comprises formulating a cost function that evaluates a deviation between the detected sensor responses and the sensor model responses of the group of position sensors, and wherein at least one of:
   one of the plurality of different relative positions, which optimizes a value of the cost function, is used as the relative position of the movable component or,
   from used relative position, the relative position of the movable component or an absolute position of the movable component related to a stationary reference point is determined.

4. The method according to claim 1, wherein the plurality of the assumed different relative positions is determined by varying the relative position of the movable component with a predetermined position increment.

5. The method according to claim 3, wherein the plurality of the assumed different relative positions is determined by performing a mathematical optimization of the cost function with respect to the relative position, wherein the relative position is varied by the optimization.

6. The method according to claim 1, wherein the plurality of the assumed different relative positions is determined by varying the relative position of the movable component by at least one pole pitch.

7. The method according to claim 6, wherein the relative position of the movable component is varied by a number of pole pitches that corresponds to at most the number of position magnets on the movable component.

8. The method according to claim 7, wherein the relative position of the movable component is varied by the number of pole pitches that corresponds to the number of position magnets on the movable component.

9. The method according to claim 1, wherein at least one further group of position sensors is used and the method further comprises:
   comparing the sensor model responses with the sensor responses detected by the at least one further group of position sensors, and
   determining the relative position of the movable component, or an absolute position of the movable component related to a stationary reference point with reference to the group of position sensors which has the smallest deviation between the sensor model responses from the sensor model and the detected sensor values.

10. A movement arrangement with at least one movable component which is arranged movably relative to a stationary component, comprising:
   an array of a plurality of position magnets with a pole pitch is arranged on the at least one movable component; and
   an arrangement with a plurality of position sensors with a sensor pitch is arranged on the stationary component,
   wherein, via one of the plurality of the position sensors, a magnetic field of one of the plurality of the position magnets in a region of the one position sensor is detectable in a form of a sensor response;
   a computing unit is configured to process sensor responses from position sensors to determine a position of the movable component relative to the stationary component,
   wherein, for a group of position sensors considered for position determination in the region of the movable component, the computing unit detects the sensor response;
   a memory unit is configured to store a sensor model, which, for the at least one movable component and a position sensor, supplies sensor model responses as a function of a relative position of the movable component relative to the position sensor,
   wherein for a plurality of assumed different relative positions of the movable component relative to the stationary component, the computing unit determines sensor model responses of the group of position sensors with the sensor model,
   wherein the computing unit is configured to compare the sensor model responses with the sensor responses detected by the group of position sensors, and
   wherein the computing unit is configured to determine at least one of:
      a relative position of the movable component from the plurality of assumed different relative positions with a smallest deviation between the sensor model responses from the sensor model and the detected sensor responses, or
      a relative position of the movable component or an absolute position of the movable component related to a stationary reference point from the determined relative position of the movable component from the plurality of assumed different relative positions with the smallest deviation between the sensor model responses from the sensor model and the detected sensor responses.

11. The movement arrangement according to claim 10, wherein the computing unit is a microprocessor-based component.

* * * * *